US007001301B2

(12) United States Patent
Wittkopp

(10) Patent No.: US 7,001,301 B2
(45) Date of Patent: Feb. 21, 2006

(54) SEALING SLEEVE FOR A HYDRAULIC ACTUATOR

(75) Inventor: Scott H. Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 66 days.

(21) Appl. No.: 10/716,576

(22) Filed: Mar. 17, 2005

(65) Prior Publication Data

US 2005/0107203 A1 May 19, 2005

(51) Int. Cl.
F16H 31/00 (2006.01)
F16D 19/00 (2006.01)
(52) U.S. Cl. .................... 475/146; 192/87; 192/11
(58) Field of Classification Search ............. 192/48.8, 192/87.11; 475/146
See application file for complete search history.

(56) References Cited

U.S. PATENT DOCUMENTS

| 4,082,011 A | | 4/1978 | McQuinn et al. ............. 74/862 |
| 4,237,749 A | * | 12/1980 | Koivunen .................... 475/281 |
| 4,964,504 A | * | 10/1990 | Friedmann ................. 192/48.4 |
| 5,492,027 A | | 2/1996 | Eaton .......................... 74/335 |

* cited by examiner

Primary Examiner—Dirk Wright
(74) Attorney, Agent, or Firm—Christopher DeVries

(57) ABSTRACT

A transmission includes at least one planetary gear set, a first clutch pack having a plurality of first clutch plates, and a second clutch pack located in series axially with the first clutch pack. The second clutch pack has a plurality of second clutch plates. A clutch apply member associated with the second clutch pack protrudes through the first clutch plates of the first clutch pack. A substantially cylindrical seal member is positioned between the first clutch pack and second clutch pack for preventing substantial flow of cooling fluid between the first and second clutch packs to direct cooling fluid through the second clutch pack when the second clutch pack is applied by the clutch apply member.

11 Claims, 3 Drawing Sheets

SEALING SLEEVE FOR A HYDRAULIC ACTUATOR

TECHNICAL FIELD

The present invention relates to a transmission including a sealing sleeve positioned between first and second clutches to enhance flow of cooling fluid through the second clutch for cooling.

BACKGROUND OF THE INVENTION

In certain transmission designs, torque converters and one-way clutches are replaced by a starting clutch and a damper to provide advantages in cost, mass and packaging. A starting clutch may be used in an automatic transmission which has a large overall ratio, and wherein the engine power to vehicle mass ratio is not too low for the vehicle to launch.

To launch the vehicle, the starting clutch is slipped for a period of several seconds and the energy created is absorbed into the starting clutch reaction plates and forced cooling oil during the shift. A typical shifting clutch is only slipped for fractions of a second and the energy created is absorbed into the reaction steels during the shift and is distributed to the cooling oil after the shift. Due to the longer shift times of the starting clutch and higher energy, the starting clutch has greater cooling needs than the typical shifting clutch.

When a starting clutch is positioned in series axially with another clutch, the clutch apply member for the starting clutch may be castellated to protrude through the other clutch for applying the starting clutch. The clutch apply member passes through the reaction plates of the other clutch by means of small circumferential sections or fingers extending through excluded sections of the other clutch.

A problem with these designs is that the cooling fluid may leak between the starting clutch and the other clutch rather than passing directly through the starting clutch, thereby limiting the cooling capacity.

SUMMARY OF THE INVENTION

In a transmission having a starting clutch positioned in series axially with another clutch, the invention provides a substantially cylindrical seal member which is positioned between the starting clutch and the other clutch to prevent substantial flow of cooling oil between the two clutches and to direct the cooling oil through the starting clutch for enhanced cooling.

More specifically, the invention provides a transmission including at least one planetary gear set, with a first clutch pack having a plurality of first clutch plates and a second clutch pack located in series axially with the first clutch pack. The second clutch pack has a plurality of second plates. A clutch apply member associated with the second clutch pack protrudes through the first clutch plates of the first clutch pack. A substantially cylindrical seal member is positioned between the first clutch pack and second clutch pack for preventing substantial flow of cooling fluid between the first and second clutch packs and to direct the cooling fluid through the second clutch pack when the second clutch pack is applied by the clutch apply member.

The clutch apply member is preferably castellated, and the second clutch is preferably a starting clutch.

Preferably, the substantially cylindrical seal member has a ring portion with a radially inwardly protruding disk portion. The ring portion is positioned radially outwardly from the clutch apply member, and the disk portion is positioned between the clutch apply member and the second clutch pack. An end of the ring portion is positioned against a retaining ring for the first clutch pack. The seal member is preferably steel.

The invention also provides a method of directing cooling fluid through a starting clutch pack arranged in series axially with a first clutch pack, wherein a clutch apply member extends through the first clutch pack for applying the starting clutch pack, and wherein there is a gap between the starting clutch pack and the first clutch pack. The method includes positioning a substantially cylindrical seal member in the gap between the starting clutch pack and the first clutch pack to prevent substantial flow of cooling fluid through the gap and to cause the cooling fluid to flow through the starting clutch pack for cooling when the starting clutch pack is applied by the clutch apply member.

The above features and advantages, and other features and advantages of the present invention, are readily apparent from the following detailed description of the best mode for carrying out the invention when taken in connection with the accompanying drawings.

DESCRIPTION OF THE PREFERRED EMBODIMENTS

Figure 1:
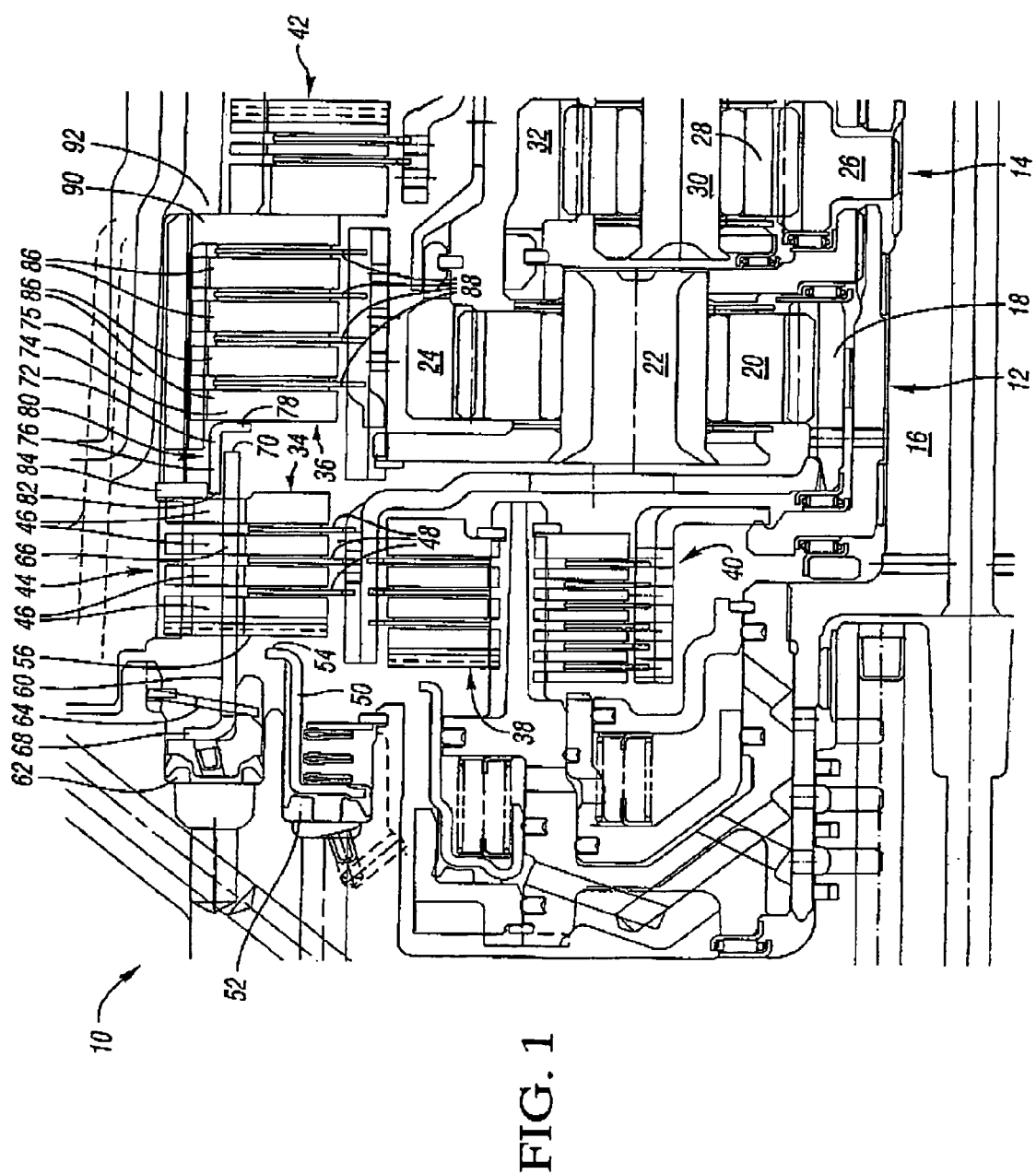
FIG. 1 is a partial longitudinal cross-sectional view of a transmission incorporating a sealing sleeve in accordance with the invention, wherein the starting clutch is in a disengaged position.

Referring to FIG. 1, a partial longitudinal cross-sectional view is shown illustrating a six speed automatic transmission 10 having first and second planetary gear sets 12, 14 which are rotatable about a turbine shaft 16. The planetary gear set 12 includes a sun gear 18, a pinion 20, a carrier 22 and a ring gear 24. The planetary gear set 14 includes a sun gear 26, a pinion 28, a carrier 30 and a ring gear 32.

The transmission 10 also includes a first clutch 34, a second clutch 36, a third clutch 38, a fourth clutch 40 and a fifth clutch 42. The first clutch 34 includes a clutch pack 44 comprised of reaction plates 46 and friction plates 48. The first clutch pack 44 is engaged by a clutch apply member 50 when pressurized hydraulic fluid is injected into the apply chamber 52. The clutch apply member 50 has an apply plate interface 54 which contacts the apply plate 56 of the first clutch pack 44 for applying the first clutch pack 44.

A clutch apply member 60 is actuated by injection of pressurized oil into the apply chamber 62, which moves the clutch apply member 60 to the right, as viewed in FIG. 1, against the bias of the spring 64 for applying the clutch pack 36. The clutch pack 36 is preferably a starting clutch.

Figure 3:
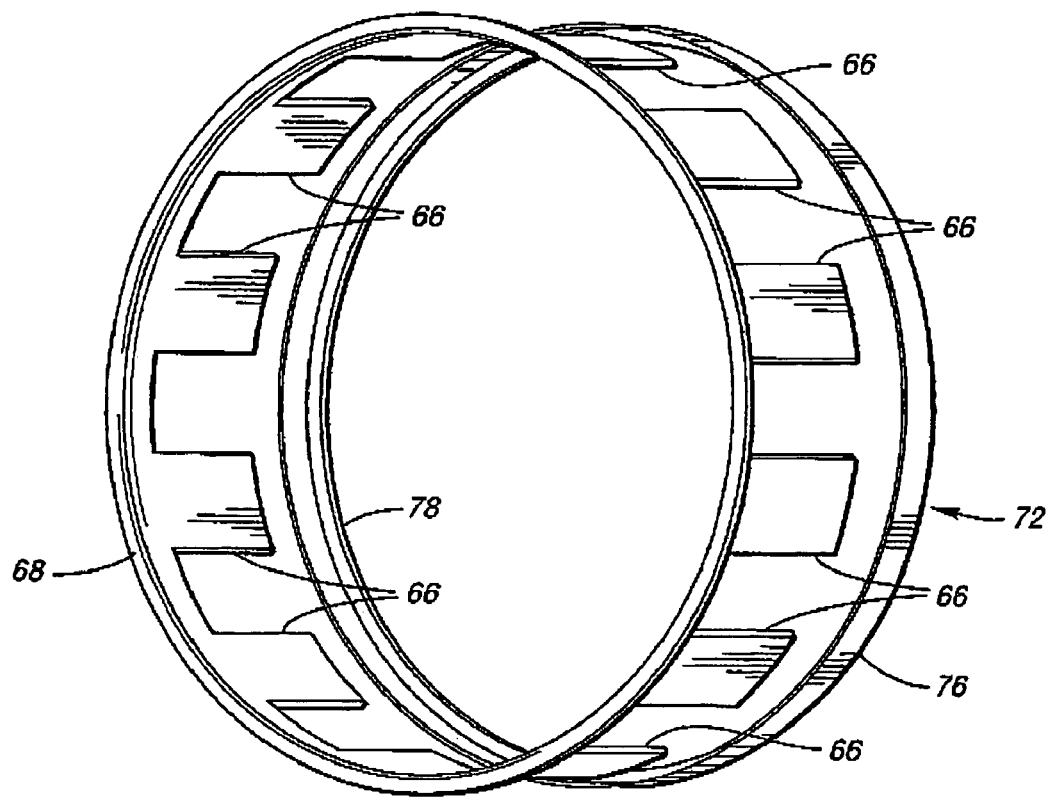
FIG. 3 is an exploded perspective view of a sealing sleeve and clutch apply member corresponding with FIGS. 1 and 2.

The clutch apply member 60 is castellated, as shown in FIG. 3, and includes fingers 66 supported on a rim 68. The fingers 66 pass through excluded sections of the reaction plates 46 shown in FIG. 1. The clutch apply member 60 has a piston apply face 70 which contacts the seal member 72, which in turn contacts the apply plate 74 for applying the clutch pack 36.

The seal member 72, as shown in FIG. 3, is substantially cylindrical, and includes a ring portion 76 with a radially inwardly protruding disk portion 78.

Cooling oil for cooling the starting clutch 36 (i.e., second clutch) is pumped from a valve body, around an annulus within the transmission case 75, and into the starting clutch 36. Returning to FIG. 1, the seal member 72 is positioned in the gap 80 between the first and second clutch packs 34, 36. A first end 82 of the seal member 72 is positioned closely adjacent the retainer 84 of the first clutch pack 44. When the clutch 36 is engaged by the clutch apply member 60, the sealing sleeve 72 extends between the retainer 84 and the apply plate 74 to thereby block the gap 80 and prevent the cooling oil from flowing through the gap 80, which causes the cooling oil to follow the flow path shown in FIG. 2.

The clutch 36 includes reaction plates 86 interleaved with friction plates 88. The backing plate 90 abuts the retainer face 92 at the opposite end of the clutch pack 36 to prevent leakage at that side (i.e., the right side shown in FIG. 1) of the clutch pack 36. The backing plate is also the clutch housing, and is splined to the transmission case.

Figure 2:
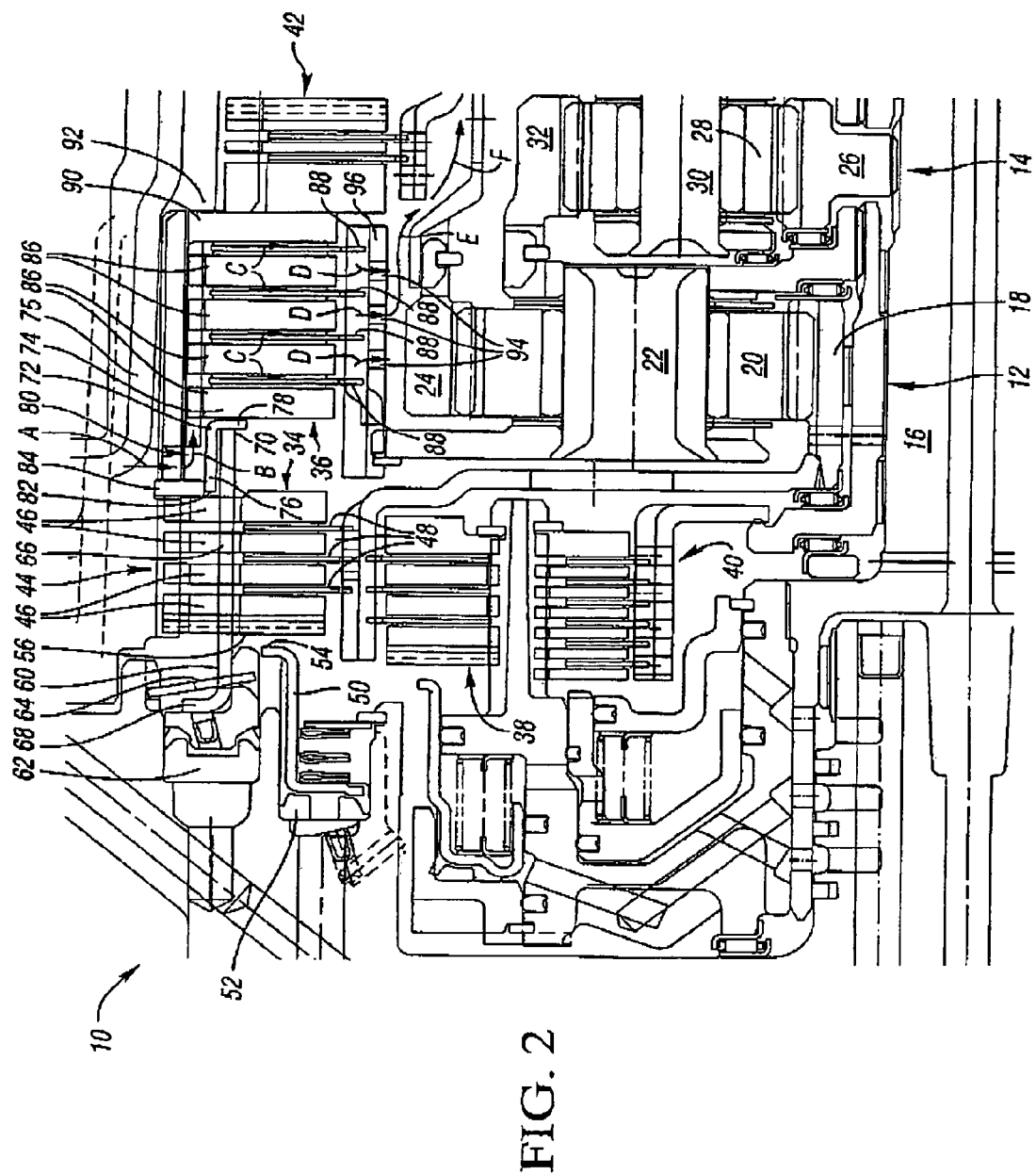
FIG. 2 is a partial longitudinal cross-sectional view of the transmission of FIG. 1 with the starting clutch in the engaged position.

As illustrated in FIG. 2, when the clutch 36 is engaged, the seal member 72 causes the cooling fluid to follow the cooling path illustrated by the arrows A, B, C, D, E, F. Therefore, the cooling fluid is forced through the starting clutch 36 during application of the starting clutch 36, and the heat generated in the reaction plates 86 and the friction plates 88 is carried away by the cooling fluid. The reaction plates 86 have one-third of their teeth removed to allow oil passage therethrough, and the friction plates 88 have small radially extending channels for oil to pass through. The arrows D illustrate the flow of oil through the apertures 94 in the clutch hub 96. Accordingly, the oil flows past the reaction plates and takes heat and goes through the holes in the hub and drains to the oil sump.

The seal member 72 or sealing sleeve is preferably an inexpensive continuous ring stamping, such as a SAE 1008 or 1010 steel, piloted by the outer diameter of the clutch apply member 60. Again, the seal member 72 has a tight clearance fit with the inner diameter of the retainer 84. The seal member 72 allows forced cooling flow to exit at the radial gap between the seal member and the retainer 84 and at the assembly gap of the retainer 84. The flow out of these orifices is significantly less than that the flow through the radial grooves cooling the clutch pack 36, and should not affect cooling. The travel of the seal member 72 should be such that when the clutch apply member 60 is stroked to apply the clutch 36, the seal member will not create an additional orifice at the clutch 36 side of the clutch 34. In addition, if cooling of the clutch 36 is required when the clutch 36 is not applied, the travel of the seal member 72 towards the clutch 34 will stop on the apply plate 74 before it can apply the clutch 34 through its travel. When the clutch 36 is not applied, the assembly gap at the backing plate 90 to retainer 92 interface will not be significant enough to affect the cooling flow.

While the best mode for carrying out the invention has been described in detail, those familiar with the art to which this invention relates will recognize various alternative designs and embodiments for practicing the invention within the scope of the appended claims.

What is claimed is:

1. A transmission including at least one planetary gear set, the transmission comprising:
   a first clutch pack having a plurality of first clutch plates;
   a second clutch pack located in series axially with the first clutch pack, said second clutch pack having a plurality of second clutch plates;
   wherein a clutch apply member associated with the second clutch protrudes through said first clutch plates of the first clutch pack; and
   a substantially cylindrical seal member positioned between the first clutch pack and second clutch pack for preventing substantial flow of cooling fluid between the first and second clutch packs and to direct the cooling fluid through the second clutch pack when the second clutch pack is applied by the clutch apply member.

2. The transmission of claim 1, wherein said substantially cylindrical seal member has a ring portion with a radially inwardly protruding disk portion.

3. The transmission of claim 2, wherein said substantially cylindrical seal member is positioned radially outwardly from the clutch apply member, and said disk portion is positioned between the clutch apply member and the second clutch pack.

4. The transmission of claim 1, wherein said second clutch pack comprises a starting clutch.

5. The transmission of claim 2, wherein an end of said ring portion is positioned against a retaining ring for the first clutch pack.

6. The transmission of claim 1, wherein said seal member comprises steel.

7. The transmission of claim 1, wherein said clutch apply member is castellated.

8. A method of directing cooling fluid through a starting clutch pack arranged in series axially with a first clutch pack, wherein a clutch apply member extends through the first clutch pack for applying the starting clutch pack, and wherein there is a gap between the starting clutch pack and first clutch pack, the method comprising:
   positioning a substantially cylindrical seal member in the gap between the first clutch pack and the starting clutch pack to prevent substantial flow of cooling fluid through the gap and to cause the cooling fluid to flow through the starting clutch pack for cooling when the starting clutch pack is applied by the clutch apply member.

9. The method of claim 8, wherein said positioning step further comprises positioning the seal member radially outwardly from the clutch apply member, with an end of the seal member positioned against a snap ring of the first clutch pack, and a radially inwardly protruding disk portion of the seal member being positioned to transfer force from the clutch apply member to the second clutch pack.

10. The method of claim 8, wherein said seal member comprises steel.

11. A transmission including at least one planetary gear set, the transmission comprising:
    a first clutch pack having a plurality of first clutch plates;
    a starting clutch pack located in series axially with the first clutch pack, said starting clutch pack having a plurality of starting clutch plates;
    wherein a clutch apply member associated with the starting clutch pack protrudes through said first clutch plates of the first clutch pack;
    a substantially cylindrical seal member positioned between the first clutch pack and the starting clutch pack for preventing substantial flow of cooling fluid between the first clutch pack and the starting clutch pack and to direct the cooling fluid through the starting clutch pack when the starting clutch pack is applied by the clutch apply member; and wherein said substantially cylindrical seal member has a ring portion with a radially inwardly protruding disk portion, and the ring portion is positioned radially outwardly from the clutch apply member, and the disk portion is positioned between the clutch apply member and the starting clutch pack.

* * * * *